Jan. 24, 1961 L. H. MORIN ET AL 2,968,821
APPARATUS AND METHOD FOR FORMING LOCKNUTS
HAVING A WASHER MOLDED IN THE NUT BODY
Filed March 4, 1958 2 Sheets-Sheet 1
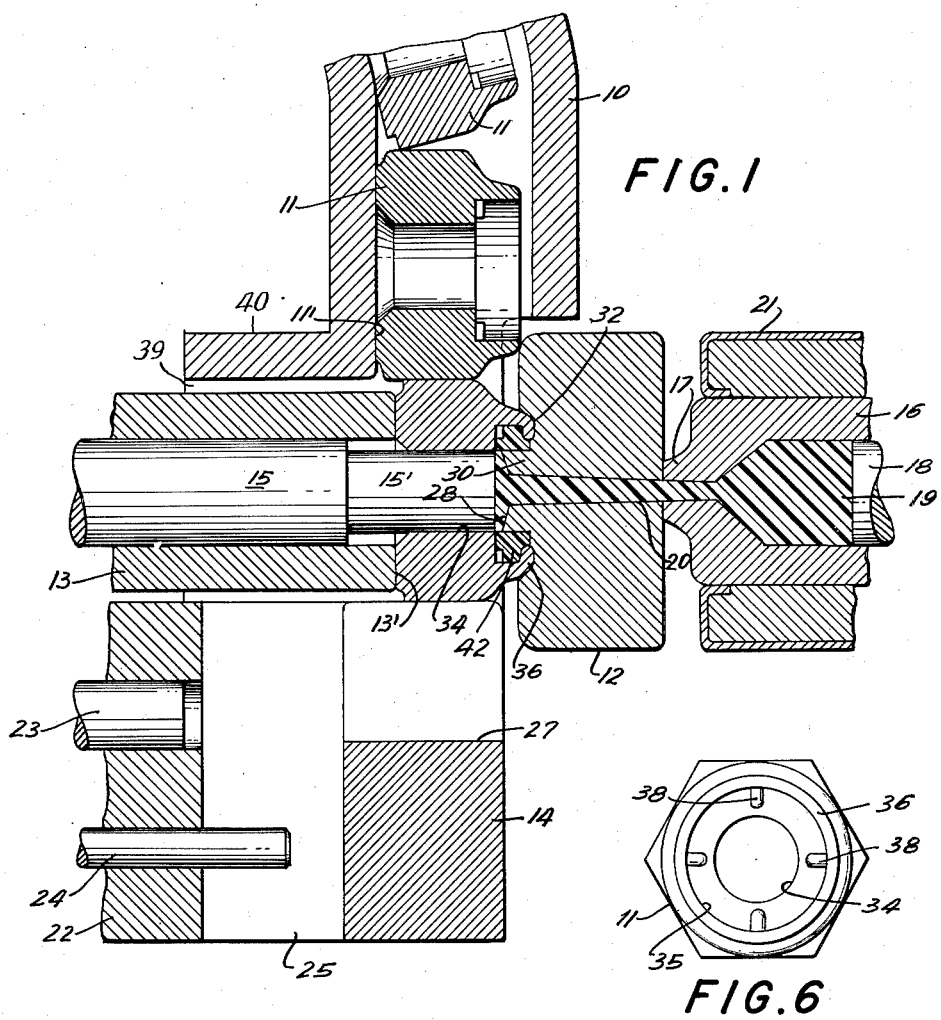
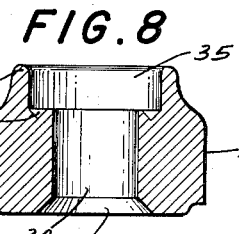
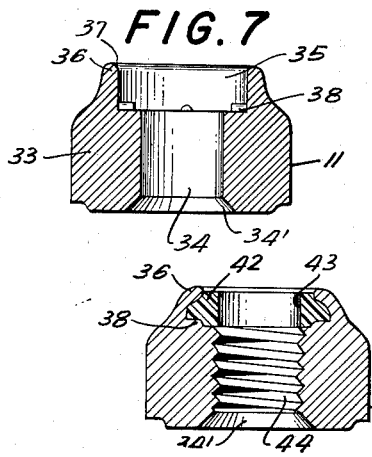
INVENTORS
LOUIS H. MORIN
OTTO GRIES
BY
Howard E. Thompson
ATTORNEY

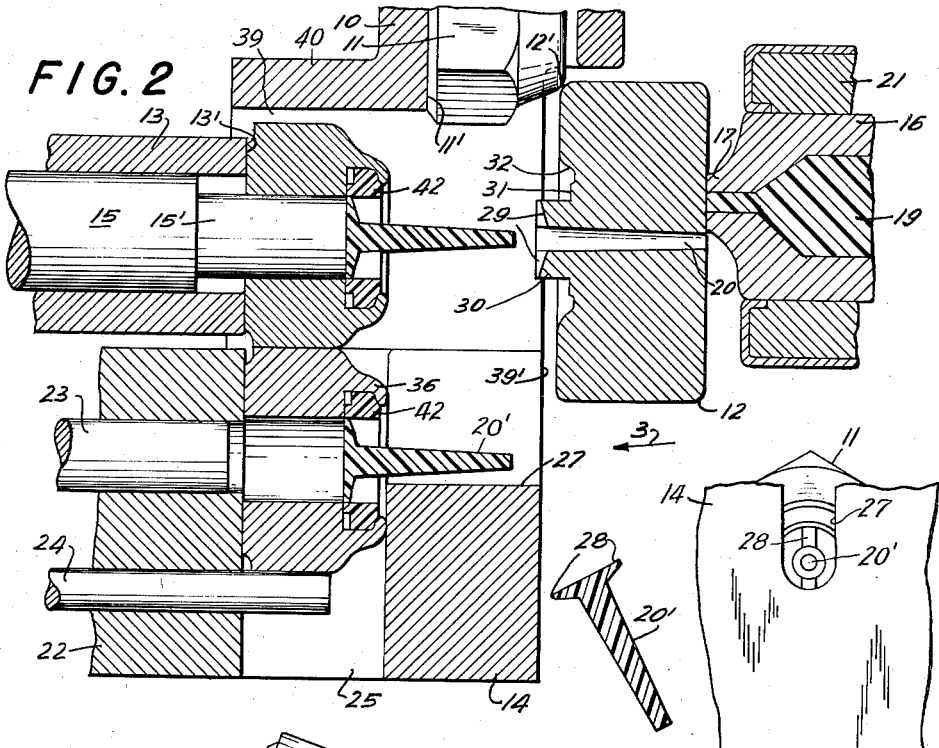

United States Patent Office 2,968,821
Patented Jan. 24, 1961

2,968,821

APPARATUS AND METHOD FOR FORMING LOCKNUTS HAVING A WASHER MOLDED IN THE NUT BODY

Louis H. Morin, Bronx, and Otto Gries, New Rochelle, N.Y.; said Gries assignor, by mesne assignments, to Coats & Clark Inc., a corporation of Delaware Filed Mar. 4, 1958, Ser. No. 719,075

11 Claims. (Cl. 10—72)

This invention relates to formation of what are generally referred to as lock nuts of the type and kind employing a molded plastic washer lock element at the outer end portion of a nut body for frictionally and tensionally retaining the nut in operative position when the nut is in use.

More particularly, the invention deals with a method and apparatus for producing lock nuts of the character described, wherein nut blanks are partially shaped or formed and the formed portion filled with a plastic washer; whereupon, the product is then trimmed at a trimming station to remove the gate and, then, deposit it into a receptacle or hopper for transmission to a further forming station to form a thread in the nut blank.

Still more particularly, the invention deals with a lock nut structure of the character described, wherein the nut blank is shaped to form key means for retaining the plastic washer element against rotation in the nut body when the nut is in use.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a diagrammatic sectional view showing the shaping of a nut blank and molding a plastic washer element in the shaped or formed portion of the blank.

Fig. 2 is a view, similar to Fig. 1, showing the parts in a different position and indicating one of the nuts at the trimming station and also diagrammatically illustrating discharge of a trimmed nut, including the removed gate.

Fig. 3 is a detail view looking in the direction of the arrow 3 of Fig. 2.

Fig. 4 is a diagrammatic view illustrating the early stages of forming the thread in the nut with the plastic washer therein.

Fig. 4A is a view similar to Fig. 4, showing the completion of the thread forming operation.

Fig. 5 is a diagrammatic sectional view through the threading member employed.

Fig. 6 is a plan view of one of the nut blanks which are employed.

Fig. 7 is a sectional view through the nut blank shown in Fig. 6.

Fig. 8 is a view similar to Fig. 7 showing a modification; and

Fig. 9 is a sectional view through the nut, as completely formed.

In Figs. 1 and 2 of the drawing, 10 represents a hopper, through which nut blanks 11 are gravity fed for positioning between a die member and forming element 12, a forming plunger 13, a stop lug 14 and an insert 15, which forms a die part when the latter is in its operative position.

Arranged at one side of the member 12 and movable relatively thereto, as noted in considering Figs. 1 and 2, is an injection cylinder 16, having a discharge nozzle 17. At 18 is shown the plunger or piston for pressure discharge of plasticized material 19 from the cylinder through the nozzle and into the gate 20 which extends through the die member 12. At 21 is diagrammatically illustrated the electric heating means for maintaining the material 19 at the proper temperature at all times.

Movable in a suitable plate or frame 22 is a trimming punch 23 and stop rod 24, the plate being spaced sufficiently from the stop lug 14 to form a discharge chamber 25, through which the finished end product 26 is free to drop into a suitable receptacle, as diagrammatically illustrated in Fig. 2 of the drawing.

The stop lug 14 has a gate or sprue discharge slot 27, as clearly noted in Fig. 3 of the drawing, and one of the discharged sprues or gates 20' is indicated in its discharged position in Fig. 2 of the drawing. At this time, it is well to point out that the laterally extending portions 28 of the gate or sprue are in the form of narrow ribs which are free to pass through the slot 27. These extending portions 28 are generally referred to as runners and are formed by recesses 29 in the surface of the die member 12 or the projection 30 thereof.

The projection 30 forms part of the mold cavity of the die member 12, the other portion thereof being formed by the shoulder 31. Note Fig. 2. Outwardly of the shoulder 31 is a curved annular workpiece forming recess 32 for shaping the workpiece when positioned at the forming and molding station, as later described.

With the present construction, the nut blanks 11 are generally of the structure shown in Figs. 6 and 7 of the drawing and comprise a nut body 33 of hexagon, octagon or other contour, having a plain bore 34 with a flared lower end 34', the bore opening at the upper end of the blank in a chamber 35 bordered by a reduced wall portion 36, having an outer contracted rounded end 37. The base of the chamber 35, beyond limits of the bore 34, has a plurality of circumferentially spaced key lugs 38, as clearly noted in Fig. 6 of the drawing.

In Fig. 8 of the drawing is shown a slight modification, in which like references identify like parts, and substituted for the key lugs 38 are a plurality of key recesses 38'.

In carrying the method into effect and assuming that a nut blank has been moved into the position against the stop lug 14 with the end 13' of the forming plunger 13 substantially in alinement with the surface 11' of the hopper 11 and the die part 15 in its retracted position, the operation is as follows.

The forming plunger 13 is moved, under pressure, in the direction of the die member 12 to engage the nut blank and to move the wall portion 36 of the blank into the forming recess 32 to shape this wall portion in the manner illustrated in Fig. 1; whereupon, the die part 15 is moved toward the nut blank, so that the reduced end 15' thereof will extend into the bore 34 and such movement continues until the reduced end 15' touches the end surface of the projection 30. It is also feasible first to partially engage the nut blank on the reduced end 15', then move plunger 13 to engage the nut blank and move the latter to die member 12 to shape the wall portion 36, and finally move the part 15 until the end surface of end 15' touches the end of projection 30.

Upon completing the above operation, the nozzle 17 is brought from the position of Fig. 2 into the position of Fig. 1 and the piston or plunger 18 is actuated to pressure discharge the plastic material 19 into the gate channel 20 and, thus, into the cavity, which is now defined between the two die parts 15 and 12, the formed wall portion 36, and the base of chamber 35. Owing to the fact that the end face of the reduced end 15' is in alinement or flush with the base of chamber 35, no plastic material can enter the bore of the nut.

Upon completing the casting step, the nozzle 17 is moved into the position of Fig. 2, thus severing the gate 20'. The plunger 13, together with the die part 15, are moved into the position of Fig. 2, such movement effecting withdrawal of the nut blank, including the tapered gate 20', from the member 12 and placing the nut in position to pass into the chamber 25. The nut blank and the casting are drawn or carried with the part 15 owing to the frictional engagement of the blank and casting on the reduced end 15'. When plunger 13 and the part or core 15 reach the position shown in Fig. 2, the plunger 13 is held stationary and core 15 is further retracted to withdraw the reduced end 15' from the nut blank, and the latter is allowed to drop into the position against the stop rod 24, as noted in Fig. 2, which position can be termed a gate trimming station.

Preferably the nut is keyed in the chamber 39 of a guide extension 40 as by disposing at least two opposite walls or surfaces of chamber 39 in proximity to corresponding sides of the nut. Such keying, which may extend to 39', improves the control over the nut during the steps of moving it away from die member 12 and stripping the core 15 from it.

At the trimming station the trimming punch 23 is actuated to remove the gate 20', and withdrawal of the rod 24 allows the trimmed nut blank product 26 to drop into a suitable receptacle or transfer hopper 41. Hopper 41 serves to transfer each product 26 to a thread-forming station, described below.

It is preferred that the extension 30 of the die member 12 be tapered outwardly to a slight extent, so as to be removable freely from the molded washer when the parts are separated, as shown in Fig. 2. No attempt, however, is made to show this slight taper, neither in the part 30, nor bore of the washer.

It will be apparent that the product 26, shown in section in Fig. 4 of the drawing, will have a plastic washer element 42 with a bore 43 therein substantially equal in diameter to the pitch diameter of threads to be formed in the bore 34, part of this forming operation being illustrated in Fig. 4. At this time, it should also be pointed out that the bore 34 of the nut blank 11 is also substantially of the pitch diameter of the thread to be formed.

In forming threads 44 in the bore 34, as noted in the final end product, Fig. 9, what is known as a "Besley" tap 45 is employed. This tap, which is semi-square in cross section as shown in Fig. 5, has circumferentially spaced thread forming portions 46 spaced from one another by circumferentially spaced flattened portions 47. The portions or edges 46 and 47 are not cutting edges, as in a conventional tap; rather, the tap rolls in the threads of the bore 34, instead of cutting them, and it accomplishes this result without formation of any chips. More particularly, the tap distorts the material of the nut, swaging the material at the bore surface in the operation of rolling in the thread.

In Fig. 4 is shown the beginning of the thread forming operation; whereas, Fig. 4A illustrates the completion of this operation, the tap 45 extending to a point in the bore where the nut material is fully threaded. The tap has a tapered forward end, as seen at 48, by means of which the tap may force its way freely through at least a part of the washer 42 without removing washer material.

If desired, and because the thread is not cut in, the tap may be extended all the way through the washer bore without cutting away the washer material, the latter being merely distorted and, owing to its resiliency, having ample gripping power when the tap is withdrawn.

It is also possible to cut the threads in the product 26 by means of a conventional cutting tap, care being taken to avoid cutting the plastic washer.

Considering Fig. 2 of the drawing, it will appear that the die member 12, including the cylinder 16, has a slight movement so that, in the operation of moving the formed workpiece from the forming station to the trimming station, this slight movement will advance the die member 12 sufficiently to bring the corner portion 12', note Fig. 2, in position to hold the next successive blank 11 against movement into the forming station. This position is maintained until such time as the formed product has dropped into the trimming station; whereupon, the die member 12 is retracted to allow the next successive nut blank to drop into position upon the surface of the stop lug 14.

Die member 12 can be maintained stationary by providing other suitable stop means for supporting the lowermost blank (Fig. 2) in hopper 10. For example, such means may comprise an intermittently movable rod which passes through an opening in the hopper to engage either the lower side or the bore of the lowermost blank, the movement of the rod being correlated with that of plunger 13 and part 15.

The blanks 11 can be formed in any desired manner; preferably they are fashioned as die castings of materials which facilitate formation of the wall portions 36 in the manner disclosed. They may also be made as screw machine parts preferably of the form shown in Fig. 8. The washer 42 is preferably a plastic, particularly a resilient material such as nylon or other polyamide.

By way of summary, the method may be seen to comprise a forming and casting station, as illustrated in Fig. 1, where the wall portion 36 of the nut blank is formed or bent from its original vertical position to an inwardly bowed shape, and where the plastic insert or washer 42 is cast within the chamber 35 of the nut blank. The nut blank acts as a die, and it will be noted that no separate cooling means are employed because the nut blank, since it is used only once as a die, acts as its own chilling medium. The member 12 comprises the die proper, having a casting material inlet leading into a die cavity. Although shown only in section, member 12 may have a circular or square or other suitable outline shape.

From the forming and casting station the nut blank is moved to a stripping station, illustrated by the position of the upper nut blank in Fig. 2, where the part or core 15 is removed from the nut blank. Following such removal, the blank passes to the gate trimming station, as illustrated by the position of the lower nut blank in Fig. 2, after which it passes to the hopper 41 which delivers it to the thread-forming station shown in Figs. 4 and 4A.

As may be apparent, while one nut blank is being trimmed, a succeeding nut blank can be introduced to the forming and casting station. Also, the withdrawal of the part 15 at the stripping station can be so correlated that the stripping action is completed to let the freed nut fall to an empty trimming station and be retained by the stop means 24.

It may be noted that die member 12 comprises a single integral piece. It has on one side thereof the annular groove 32, which is defined by the corresponding annularly extending surface of the die, which surface, when the die is viewed in a cross-section formed by a plane passing parallel to and including the central axis of the die, is concavely curved. The shoulder 31 defines an annular recess which is concentric with but of smaller diameter and smaller depth than the groove 32. This annular recess and the groove 32 communicate with each other. Radially inwardly of the annular recess is the projection 30 of circular cross-section which extends from the annular recess and has an end face that is outwardly spaced from the said one side of the die. The oppositely disposed, radially extending recesses or gate channels 29 are in the end face of the projection, each extending from the casting material inlet 20 and opening through a lateral surface of the projection. The channels also open through the end face of the projection. The die on its other side has a smooth flat surface engageable by the injection nozzle.

In considering the end product, it will appear that the washer 42 is firmly housed within the inturned wall portion 36 and that the key lugs 38 retain the washer against rotation.

It will be apparent that, with the present method, end products of the type and kind under consideration can be produced at a high rate of speed, thereby economizing on the cost of production of the same. The nut blanks can be economically cast on high speed casting machines, and further economies are provided by the gravity feed of the blanks.

From the standpoint of apparatus, of which the present illustrations are purely diagrammatic, it will appear that one of the distinctive features of this apparatus and the method disclosed resides in the fact that very simple die parts are employed, namely the parts 12 and 15. As indicated, the balance of the mold cavity, defining the structure of the resulting plastic washer, is formed by the annular chamber between the die extension 30 and the formed wall portion 36. It will, thus, be apparent that this simple die structure minimizes the operative mechanism employed in the machine. In particular, the use of the stationary or substantially stationary die member 12 represents a considerable simplification over a conventional pair of dies that are conventionally moved towards and from each other.

Having fully described our invention, what we claim as new and desire to secure by Letters Patent is:

1. The method of producing lock nuts of the character described, which consists in delivering nut blanks, having a bore and an enlarged chamber at one end bordered by a reduced wall portion, to a forming and molding station having a combination forming and molding die, then pressure advancing the nut blank upon said die to form the reduced wall of said chamber to predetermined contour, then moving an insert and die part into the bore of said nut blank with the surface of said insert abutting said die, then pressure injecting heated plastic material through a gate in said forming and molding die into the cavity formed by said chamber, die and surface of said insert to form a plastic washer element in the chamber of the nut blank, then withdrawing the product, thus formed, from the die sufficiently to clear the gate of the product from said die, then removing said insert from the product to allow the product to drop to a trimming station, the trimming station having means to definitely position the product at the station, with the bore of the nut blank in alinement with a trimming punch, then actuating the punch to trim the gate from the molded washer, and then freeing the finished end product for displacement from the trimming station to a suitable receiver.

2. The method as defined in claim 1, wherein the the chamber portion of the nut blank is fashioned to provide means engaged by the molded plastic washer to key the washer against rotary movement in the chamber of said nut blank.

3. The method as defined in claim 2, wherein the bore of the nut blank is fashioned, at a forming station, to form threads in said bore extending to said plastic washer.

4. The method as defined in claim 3, wherein the bore of the plastic washer is substantially in alinement with the pitch diameter of the threads formed in said bore.

5. The method as defined in claim 1, wherein the nut blank is fashioned, at a forming station, to roll the material in the bore of the blank to form a thread therein.

6. An apparatus for producing lock nuts of the character described, comprising a forming and molding station having a combination forming and molding die with a tapered gate passage extending through the die and a projection on one side thereof, a forming plunger and insert movable toward and from said die, means for delivering nut blanks to said station in a position between the die and said plunger and insert, each nut blank having a bore and an enlarged chamber at one end, bordered by a reduced wall, the chamber and wall facing said die, when the blank is positioned at said station, said forming plunger being movable to advance the nut blank onto the die in shaping the reduced wall of the blank to partially close said chamber, said insert being movable into the bore of the nut blank to a position abutting the projection of the die positioned in said chamber, means for pressure injecting heated plastic material through the gate of said die into the cavity formed by said chamber, die and surface of the insert to form a plastic washer in said chamber, a trimming station adjacent said first named station, the trimming station including means for definitely positioning a nut blank at the trimming station, with the bore of the nut blank in alinement with a trimming punch, the nut blank moving to the trimming station upon release of the insert from the bore of the blank, and said trimming punch being actuated to remove the gate portion formed integrally with said washer from the washer to produce the resulting lock nut end product.

7. A structure as defined in claim 6, wherein the chambered portion of the nut blank is fashioned to form means keying the plastic washer against rotation in the nut blank.

8. A structure as defined in claim 7, wherein the trimmed nut blank is delivered to a station having a thread shaping tool, and said tool being movable through the bore of the nut blank in rolling a thread in said bore.

9. Method of producing lock nuts each comprising a nut having a threaded bore which opens through one end portion thereof, said bore at the other end portion of the nut merging into an enlarged end-opening recess having an annular plastic insert therein, which comprises introducing a nut blank by gravity feed to a forming and casting station, said nut blank having a bore and being characterized by having a straight-sided annular wall defining said recess and extending outwardly from said other end portion of the blank, said recess having a base in which are disposed a plurality of spaced lugs, moving the nut blank into contact with a die so that said annular wall engages a corresponding annular surface of a cavity in said die, pressing the nut blank against said surface to bend said annular wall radially inwardly of said recess, engaging said one end of the blank by a core and moving said core into the bore of the blank until the end face of the core is flush with the base of said recess and abuts said die to form a gate channel having communication with said recess, thereby forming a composite cavity comprising said die cavity and said recess, injecting plastic material to said composite cavity to form in said recess an annular insert having a gate, said insert engaging said lugs and being interlocked therewith to prevent rotation of the insert relatively to the nut blank, moving the core and the blank away from said die to a core stripping station, withdrawing the core from the blank at said last station, moving the blank by gravity to a trimming station and trimming the gate from said insert, then moving the blank to a thread-forming station and forming a thread in the bore thereof, and thereby producing said insert-containing lock nut.

10. A combined forming and casting die for producing an annular plastic locking insert in a nut blank, wherein said blank has a bore which opens through one end portion thereof, said bore at the other end portion of the blank merging into an enlarged end-opening recess for receiving said annular plastic insert therein, and wherein said recess is defined by a straight-sided annular wall extending outwardly from said other end portion of the blank; said die having on one side thereof an annular groove defined by an annularly extending surface of the die, said surface, when the die is viewed in a cross-section formed by a longitudinal plane including the central axis of the die, being concavely curved; an annular recess concentric with but of smaller diameter and smaller depth than said groove; and, radially inwardly of said annular recess, a projection of circular cross-section extending from said annular recess and having an end face that is outwardly spaced from said one side of the die; said die having a casting material inlet extending therethrough and opening through the other side of the die and through the end face of said projection; a pair of oppositely disposed, radially extending gate channels in the end face of the projection each extending from said inlet and opening through a lateral surface of the projection, said channels also opening through the end face of the projection; a forming plunger and insert movable toward and from said die, the latter axially through said blank and adapted to cooperate with said projection to form a communicating channel from the interior of said die to said recess, said annular groove being engageable by the annular wall of the nut blank and, upon the application of force to the blank, serving to form said wall by bending the latter radially inwardly of said enlarged recess in the blank; said annular recess of the die and the lateral surface of said projection forming a part of a composite die cavity in which said plastic insert is cast; said die on said other side thereof having a smooth flat surface engageable by an injection nozzle by means of which casting material is introduced through said inlet and gate channels into said composite die cavity; and said gate channel passing through said die and tapered to permit ready separation of die and gate.

11. A combined forming and casting die for producing an annular plastic locking insert in a nut blank, said die comprising a single integral piece and having on one side thereof an annular groove; an annular recess concentric with but of smaller diameter than said groove, said recess and groove being in communication with each other; and, radially inwardly of said annular recess, a projection of circular cross-section extending from said annular recess and having an end face that is outwardly spaced from said one side of the die; said die having a casting material inlet extending therethrough and opening through the other side of the die and through the end face of said projection, said inlet being tapered to permit ready separation of said die and the gate formed in said inlet during use of said die; at least one gate channel in the projection extending from said inlet and opening through a lateral surface of the projection and the surface of said projection adapted to cooperate with a flat surface to form a closed passageway for said gate channel; said annular groove being engageable by the nut blank and serving to reshape said blank to form insert-retaining means thereon; said annular recess of the die and the lateral surface of said projection forming a part of a composite die cavity in which said plastic insert is cast; and said die on said other side thereof having a smooth flat surface engageable by an injection nozzle by means of which casting material is introduced through said inlet and gate channel into said composite die cavity.

References Cited in the file of this patent
UNITED STATES PATENTS

| | | |
|---|---|---|
| 2,070,032 | Swanstrom | Feb. 9, 1937 |
| 2,286,336 | Brooke | June 16, 1942 |
| 2,348,308 | Richardson | May 9, 1944 |
| 2,367,303 | Morin | Jan. 16, 1945 |
| 2,385,927 | Mason | Oct. 2, 1945 |
| 2,407,314 | Mason | Sept. 10, 1946 |
| 2,421,105 | Warren | May 27, 1947 |
| 2,582,260 | Kutik | Jan. 15, 1952 |
| 2,766,080 | Fineran | Oct. 9, 1956 |